US009143944B2

(12) United States Patent
Gong et al.

(10) Patent No.: US 9,143,944 B2
(45) Date of Patent: Sep. 22, 2015

(54) SECURE PEER-TO-PEER NETWORK SETUP

(75) Inventors: Michelle X. Gong, Sunnyvale, CA (US); Jesse Walker, Hillsboro, OK (US); Roy Want, Los Altos, CA (US); Horst W. Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 13/976,171

(22) PCT Filed: Sep. 1, 2011

(86) PCT No.: PCT/US2011/050237
§ 371 (c)(1),
(2), (4) Date: Jun. 26, 2013

(87) PCT Pub. No.: WO2013/032483
PCT Pub. Date: Mar. 7, 2013

(65) Prior Publication Data
US 2013/0276075 A1  Oct. 17, 2013

(51) Int. Cl.
*G06F 17/00* (2006.01)
*H04W 12/08* (2009.01)
*H04W 76/02* (2009.01)
*H04W 12/06* (2009.01)
(Continued)

(52) U.S. Cl.
CPC .............. *H04W 12/08* (2013.01); *H04W 12/06* (2013.01); *H04W 76/02* (2013.01); *H04L 67/1044* (2013.01); *H04W 4/08* (2013.01)

(58) Field of Classification Search
USPC ........................ 726/5; 705/44; 709/208, 226
See application file for complete search history.

(56) References Cited

U.S. PATENT DOCUMENTS

| | | | | |
|---|---|---|---|---|
| 8,332,323 | B2 * | 12/2012 | Stals et al. | 705/44 |
| 8,823,494 | B1 * | 9/2014 | Kovitz et al. | 340/10.1 |
| 2008/0162346 | A1 * | 7/2008 | Aaron et al. | 705/44 |

(Continued)

FOREIGN PATENT DOCUMENTS

| | | |
|---|---|---|
| EP | 1860822 | 11/2007 |
| KR | 2006/0080007 | 7/2006 |
| KR | 2009-0030141 | 3/2009 |

OTHER PUBLICATIONS

PCT Search Report and Written Opinion, PCT/US2001/050237, mailed Feb. 9, 2012, pp. 11.

(Continued)

*Primary Examiner* — Joseph P Hirl
*Assistant Examiner* — Sayed Beheshti Shirazi
(74) *Attorney, Agent, or Firm* — Blakely, Sokoloff, Taylor & Zafman LLP

(57) ABSTRACT

Apparatuses for peer-to-peer network setup are presented. In one embodiment, an apparatus comprises a wireless processing unit to communicate with a master device. The wireless processing unit is operable to receive encoded data in a two-dimensional (2D) barcode. The encoded data comprise at least user information associated with the master device including a user identifier, a device identifier, or both. The encoded data further comprise network information including a network identifier, a password, and a profile lifetime value. In one embodiment, the apparatus further comprises a display unit to display at least part of the user information and the network information to a user. The wireless processing unit is operable to initiate a peer-to-peer network setup with the master device based at least on a response from the user.

14 Claims, 5 Drawing Sheets

(51) Int. Cl.
*H04L 29/08* (2006.01)
*H04W 4/08* (2009.01)

(56) References Cited

U.S. PATENT DOCUMENTS

| | | | |
|---|---|---|---|
| 2008/0231716 A1* | 9/2008 | Anderson | 348/211.3 |
| 2009/0068982 A1* | 3/2009 | Chen et al. | 455/407 |
| 2009/0228707 A1 | 9/2009 | Linsky | |
| 2010/0064043 A1* | 3/2010 | Iino et al. | 709/226 |
| 2010/0091313 A1* | 4/2010 | Kitada et al. | 358/1.13 |
| 2010/0262829 A1 | 10/2010 | Brown et al. | |
| 2010/0283600 A1* | 11/2010 | Herbert et al. | 340/539.1 |
| 2010/0306335 A1* | 12/2010 | Rios et al. | 709/211 |
| 2011/0081860 A1* | 4/2011 | Brown et al. | 455/41.3 |
| 2011/0149086 A1* | 6/2011 | Winbush, III | 348/207.1 |
| 2012/0205431 A1* | 8/2012 | Chang et al. | 235/375 |
| 2012/0209933 A1* | 8/2012 | Ridges et al. | 709/208 |
| 2012/0329473 A1* | 12/2012 | Ekbatani | 455/456.1 |
| 2013/0023339 A1* | 1/2013 | Davis et al. | 463/29 |
| 2013/0031261 A1* | 1/2013 | Suggs | 709/228 |
| 2014/0256407 A1* | 9/2014 | Graf et al. | 463/22 |

OTHER PUBLICATIONS

McCune, Jonathan M., et al., "Seeing-Is-Believing; Using Camera Phones for Human-Verifiable Authentication", Int. J. Security and Networks, vol. 4, Nos. 1/2, 2009, pp. 43-56.

Rohs, Michael, et al., "A Conceptual Framework for Camera Phone-Based Interaction Techniques", Institute or Pervasive Computing, Department of Computer Science, Swiss Federal Institute of Technology (ETH), Zurich, Switzerland, 19 pages.

European Search Report for EP Counterpart Application No. 11871405.4, 5 pgs., (Apr. 14, 2015).

* cited by examiner

User name: Katie
Device name: Katie's phone
SSID: FotoNet
Network type: AdHoc(fully connected)
Security: PIN+WPA2
PIN: 7391123505033498219
Lifetime: 6hours

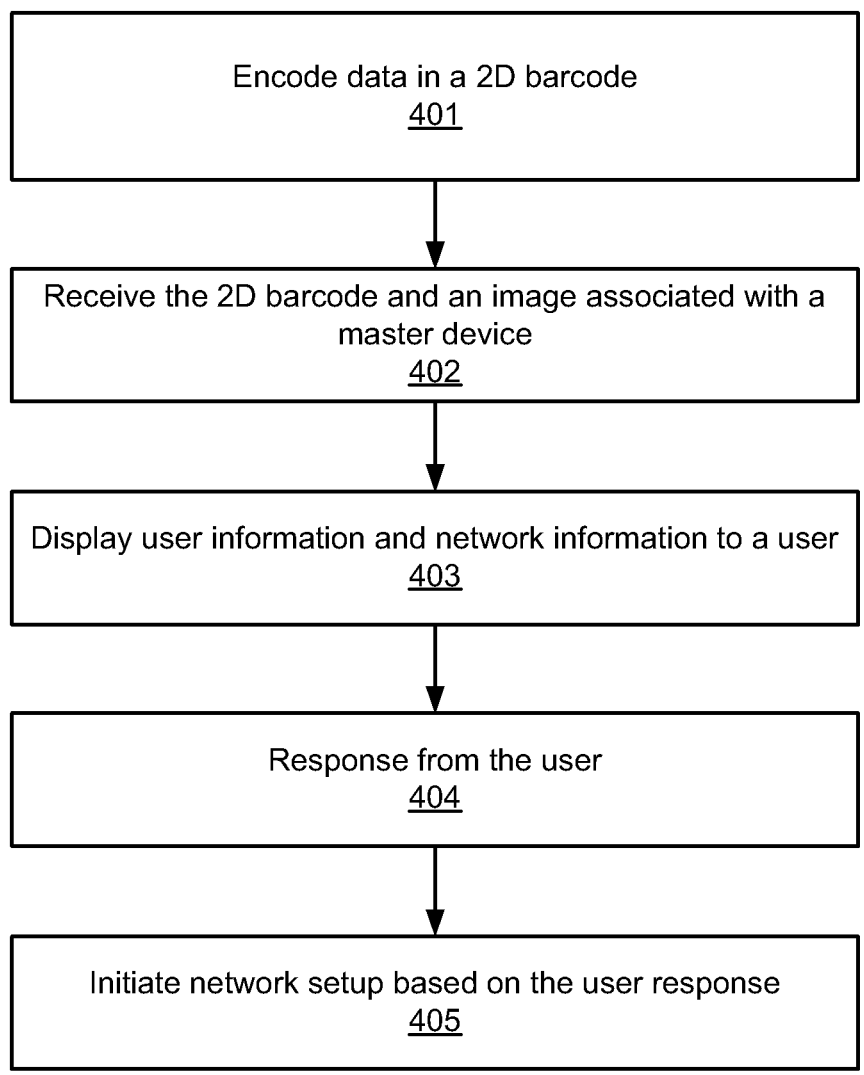

SECURE PEER-TO-PEER NETWORK SETUP

CROSS-REFERENCE TO RELATED APPLICATION

This patent application is a U.S. National Phase Application under 35 U.S.C. §371 of International Application No. PCT/US2011/050237, filed Sep. 1, 2011.

FIELD OF THE INVENTION

Embodiments of the invention relate to the field of data network, and more particularly to wireless network.

BACKGROUND OF THE INVENTION

Wireless network setup procedures may be slow and cumbersome. For instance, many network setup procedures require a user to remember the name of a network, the type of a security suite used in the network, and a password (e.g., PIN). Short passwords or passwords with a low security (e.g., dictionary words) are often used because so that users can remember them easily. This severely compromises network security. A user is also required to input such information by using a keyboard which is not ideal for small mobile devices, such as, for examples, tablets, smart phones, and cameras.

Peer-to-peer networks are often set up on the fly. In many cases, a user may not want to retain the peer-to-peer network information permanently in a mobile device. A user may not want the mobile device to automatically connect to other devices as soon as they are in the proximity.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 4 is a flow diagram of one embodiment of a process to setup a peer-to-peer network.

DETAILED DESCRIPTION OF THE INVENTION

Figure 1:
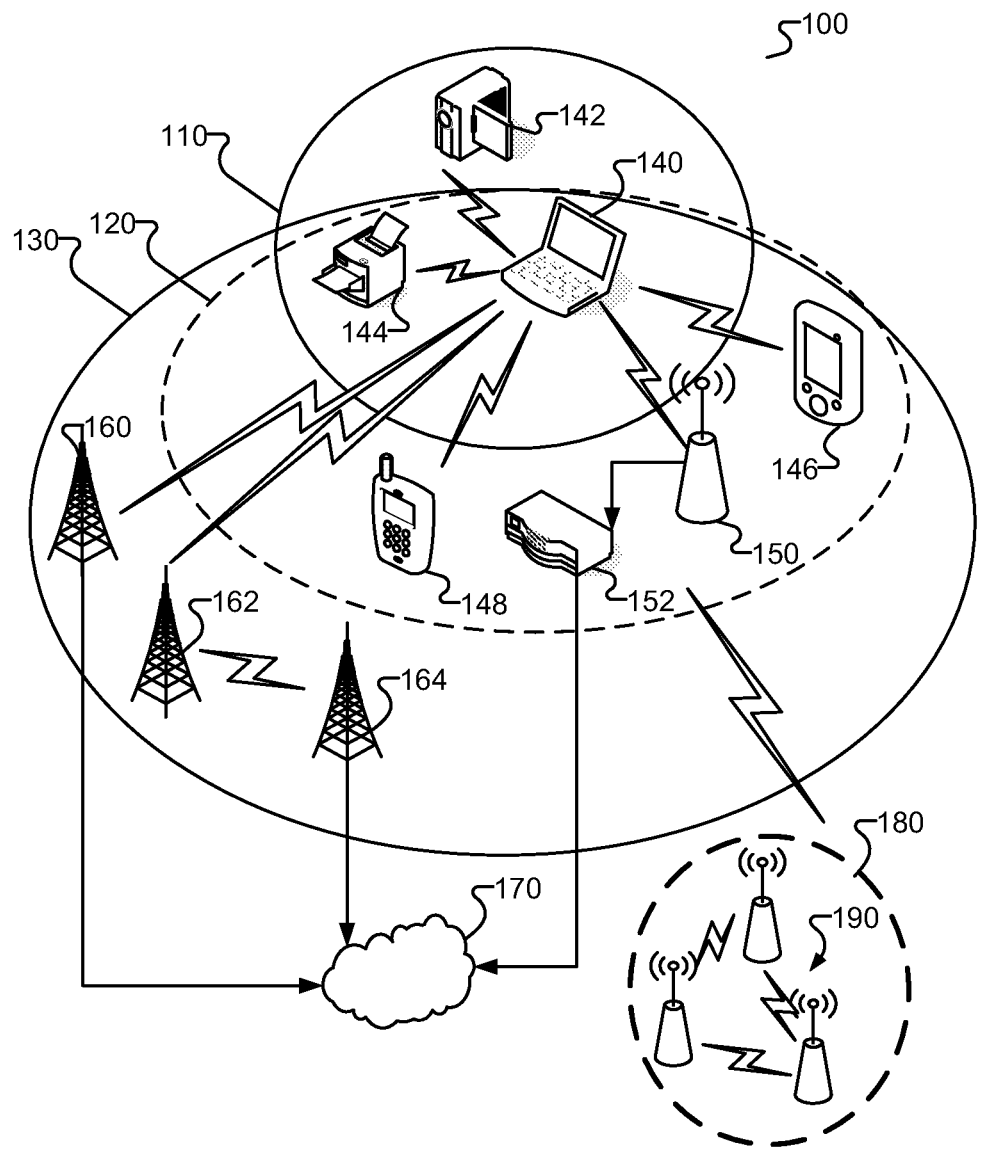
FIG. 1 is a diagram representation of a wireless communication system in accordance with one embodiment of the invention.

Apparatuses for peer-to-peer network setup are presented. In one embodiment, an apparatus comprises a wireless processing unit to communicate with a master device. The wireless processing unit is operable to receive encoded data in a two-dimensional (2D) barcode. The encoded data comprise at least user information associated with the master device including a user identifier, a device identifier, or both. The encoded data further comprise network information including a network identifier, a password, and a profile lifetime value. In one embodiment, the apparatus further comprises a display unit to display at least part of the user information and the network information to a user. The wireless processing unit is operable to initiate a peer-to-peer network setup with the master device based at least on a response from the user.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Wireless Communication System

FIG. 1 is a diagram representation of a wireless communication system in accordance with one embodiment of the invention. Referring to FIG. 1, in one embodiment, wireless communication system 100 includes one or more wireless communication networks, generally shown as 110, 120, and 130.

In one embodiment, the wireless communication system 100 includes a wireless personal area network (WPAN) 110, a wireless local area network (WLAN) 120, and a wireless metropolitan area network (WMAN) 130. In other embodiments, wireless communication system 100 includes additional or fewer wireless communication networks. For example, wireless communication network 100 includes additional WPANs, WLANs, and/or WMANs. The methods and apparatus described herein are not limited in this regard.

In one embodiment, wireless communication system 100 includes one or more subscriber stations (e.g., shown as 140, 142, 144, 146, and 148). For example, the subscriber stations 140, 142, 144, 146, and 148 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 100 includes more or fewer subscriber stations.

In one embodiment, subscriber stations 140, 142, 144, 146, and 148 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MDM), other suitable modulation techniques, or combinations thereof to communicate via wireless links.

In one embodiment, laptop computer 140 operates in accordance with suitable wireless communication protocols that require very low power, such as, for example, Bluetooth®, ultra-wide band (UWB), radio frequency identification (RFID), or combinations thereof to implement the WPAN 110. In one embodiment, laptop computer 140 communicates with devices associated with the WPAN 110, such as, for example, video camera 142, printer 144, or both via wireless links.

In one embodiment, laptop computer 140 uses direct sequence spread spectrum (DSSS) modulation, orthogonal frequency-division multiplexing (OFDM) modulation, or both to implement the WLAN 120 (e.g., a basic service set (BSS) network in accordance with the 802.11 family of standards developed by the Institute of Electrical and Electronic Engineers (IEEE) or variations and evolutions of these standards). For example, laptop computer 140 communicates with devices associated with the WLAN 120 such as printer 144, handheld computer 146, smart phone 148, or combinations thereof via wireless links.

In one embodiment, laptop computer 140 also communicates with access point (AP) 150 via a wireless link. AP 150 is operatively coupled to router 152 as described in further detail below. Alternatively, AP 150 and router 152 may be integrated into a single device (e.g., a wireless router).

In one embodiment, laptop computer 140 uses OFDM modulation to transmit large amounts of digital data by splitting a radio frequency signal into multiple small sub-signals, which in turn, are transmitted simultaneously at different frequencies. In one embodiment, laptop computer 140 uses OFDM modulation to implement WMAN 130. For example, laptop computer 140 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 160, 162, and 164, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 120 and WMAN 130 are operatively coupled to network 170 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 120 is operatively coupled to network 170 via AP 150 and router 152. In another embodiment, WMAN 130 is operatively coupled to network 170 via base station(s) 160, 162, 164, or combinations thereof. Network 170 includes one or more network servers (not shown).

In one embodiment, wireless communication system 100 includes other suitable wireless communication networks, such as, for example, wireless mesh networks, shown as 180. In one embodiment, AP 150, base stations 160, 162, and 164 are associated with one or more wireless mesh networks. In one embodiment, AP 150 communicates with or operates as one of mesh points (MPs) 190 of wireless mesh network 180. In one embodiment, AP 150 receives and transmits data in connection with one or more of MPs 190. In one embodiment, MPs 190 include access points, redistribution points, end points, other suitable connection points, or combinations thereof for traffic flows via mesh paths. MPs 190 use any modulation techniques, wireless communication protocols, wired interfaces, or combinations thereof described above to communicate.

In one embodiment, wireless communication system 100 includes a wireless wide area network (WWAN) such as a cellular radio network (not shown). Laptop computer 140 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WPAN, a WLAN, and a WMAN, in one embodiment, wireless communication system 100 includes other combinations of WPANs, WLANs, WMANs, and WWANs. The methods and apparatus described herein are not limited in this regard.

In one embodiment, wireless communication system 100 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 140, 142, 144, 146, and 148) AP 150, or base stations (e.g., 160, 162, and 164) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Overview

A network apparatus capable of performing a light-weight and secure network setup procedure for different types of peer-to-peer (P2P) networks is presented. In one embodiment, the apparatus is capable to set up the peer-to-peer networks on the fly without much user intervention. In one embodiment, the procedure does not require a user to remember network information. A peer-to-peer network may be formed in a star topology in which all devices communicate with one master device. A peer-to-peer network may also be formed in a fully-connected topology in which each device communicates with any other device in the network.

Figure 2:
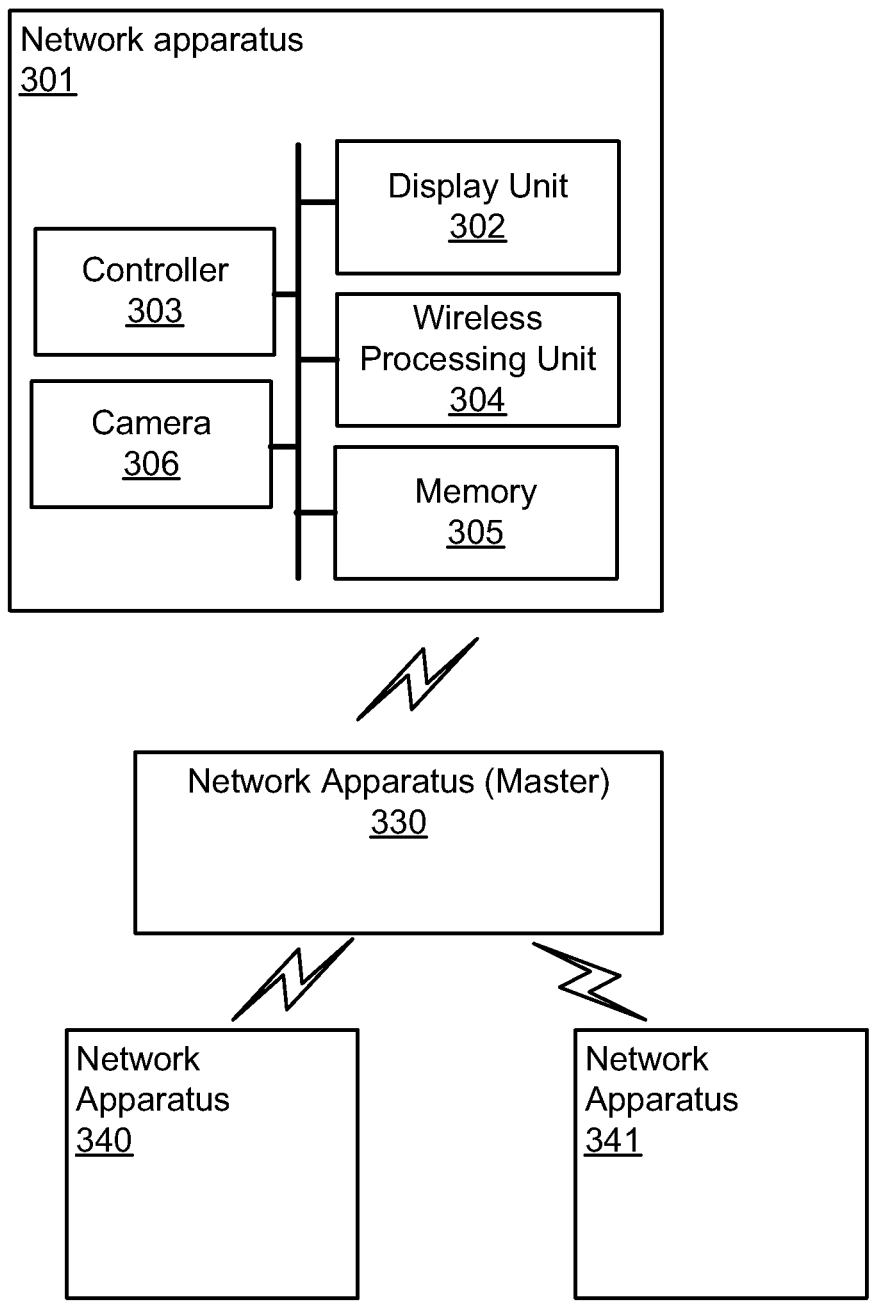
FIG. 2 shows a network apparatus in accordance with one embodiment of the invention.
Figure 3A:
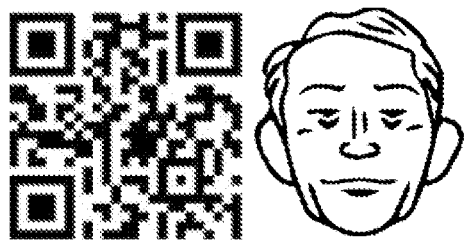
FIG. 3A shows a QR (quick response) code and the user picture shown on a display unit in accordance with one embodiment of the invention.
Figure 3B:
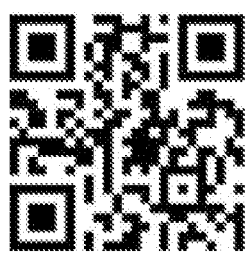
FIG. 3B shows network information and the user picture shown on a display unit in accordance with one embodiment of the invention.

FIG. 2 shows a network apparatus in accordance with one embodiment of the invention. FIG. 3A shows a QR (quick response) code and the user picture shown on a display unit in accordance with one embodiment of the invention. FIG. 3B shows network information and the user picture shown on a display unit in accordance with one embodiment of the invention.

Referring to FIG. 2, in one embodiment, network apparatus 301 comprises display unit 302, controller 303, wireless processing unit 304, memory 305, and camera 306. In one embodiment, the aforementioned units are shown as discrete devices. Other embodiments are possible where some or all of these units are integrated within a device or within other devices. In other embodiments, the aforementioned units are distributed throughout a system in hardware, software, or some combination thereof. In one embodiment, the network apparatus is an embodiment of a wireless electronic device, a server, an access point, or a base station with respect to FIG. 1.

In one embodiment, network apparatus 301 forms a peer-to-peer network with network apparatus 330 acting as a master device. In a star topology network, network apparatuses 301, 340, and 341 each communicates with network apparatus 330 (master) to form the network. In a fully connected network, network apparatus 301, 340, 341, and 330 establish connections to communicate with each others.

In one embodiment, a QR code is a matrix barcode (or a two-dimensional code) readable by QR barcode readers and mobile platforms with cameras. An example of QR code is shown in FIG. 3A. In one embodiment, information that are encoded into the QR code includes: 1) user name and/or device name; 2) network name (e.g., service set ID (SSID) for Wi-Fi); 3) supported security suites name and security schemes; 4) password (e.g., PIN); 5) network type; 6) profile lifetime value; 7) MAC address of the admission control node (e.g., a master device is a peer-to-peer network).

In one embodiment, wireless processing unit 304 is operable to receive an image associated with a master device or a user of the master device (e.g., network apparatus 301). Display unit 302 is operable to display the image for the user to verify an identity of the master device. In one embodiment, wireless processing unit 304 includes a QR code processing unit capable of receiving the barcode in a camera image. In one embodiment, the QR processing unit is a discrete unit. In one embodiment, the QR code processing unit decodes the information from the QR code, transfers the network information to wireless processing unit 304 or controller 303, and transfers the user and network information to display unit 302.

In one embodiment, wireless processing unit 304 is capable to receive the user information via non-secured communication. Wireless processing unit 304 is operable to store the network information based at least on the first user's preference and the profile lifetime value.

In one embodiment, a user name and a device name are identification factors for setting P2P network setup. For example, the user information associated with the master device is used for an identification purpose instead of using a physical IP address of the first master device. A device (e.g., network apparatus 330) serves as an admission control point. The device is configured to support peer-to-peer networking. For example, network apparatus 330 (when acting as a master device) stores user information, such as, for example, user name, device name, and the network information (e.g., network name, security scheme, password. etc.).

In one embodiment, a device is capable of supporting different types of P2P networks. A user may choose which type to use. The user of a network apparatus (e.g., network apparatus 301) does not need to input any security information each time a network setup begins. In one embodiment, a user (or an application/program) identifies what the peer-to-peer type is and whether the network would be maintained for a period of time (regardless of whether the devices are in a standby mode or the application that triggers the network setup has been terminated or suspended). In one embodiment, all other related information is automatically obtained from the device.

In one embodiment, a device serves as the admission control point (e.g., network apparatus 330) displays a QR code on its display unit (a screen). In one embodiment, the device displays a picture of the user together with the QR code as illustrated in FIG. 3A. In one embodiment, the user picture is encoded as part of the QR code. In another embodiment, two devices (e.g., network apparatuses 301 and 330) exchange user pictures after the connection has been setup.

In one embodiment, a device captures the QR code by using a camera in order to join the peer-to-peer network. In one embodiment, a device either captures the user picture or decodes the user picture from a QR code and displays the picture on the screen. In another embodiment, two devices exchange user pictures after the connection has been setup. A user picture is used to represent the connected user or device. In one embodiment, a user picture may be an avatar, an image, a video, etc. In comparison to other network setup, such information exchange (via QR code) and the identification of individual users/devices support a fast and secure peer-to-peer network setup.

In one embodiment, the information encoded in a QR code is displayed on a screen together with network information a device (e.g., network apparatus 301) as illustrated in FIG. 3B. In one embodiment, a security type and a password are encoded in the QR code but a user may have the option to determine whether or not to display them on the screen.

In one embodiment, a network setup procedure is initiated after a user verifies that the network information displayed on the screen and agrees to connect to the network. In one embodiment, users are not required to remember the security type or the password of a network therefore a sophisticated security scheme and a long password (e.g., more than 8 characters) may be used to mitigate security attacks.

In one embodiment, a password (e.g., PIN) is used as a shared secrete among all devices in a network if a network type is "fully-connected". Any device may derive the Pre-Shared Key (PSK) from the password and use the PSK to set up connections with other devices in the same network. If the network type is in a star topology, devices only set up connections with a master device.

In one embodiment, after a peer-to-peer network is set up, users are prompted to choose whether to retain the network profile permanently in the device or to delete the network profile after the lifetime of the network has expired. In one embodiment, for example, a master device chooses two days as the lifetime of the network, the network profile will be saved for at least two days at other devices. Within the two days lifetime, a device is capable of automatically connect to the network without having to repeat the network setup procedure.

In one embodiment, network apparatus 301 displays user picture for authentication and identification purpose in a peer-to-peer network. The peer-to-peer network setup is initiated without the first user entering the password. In one embodiment, for example, a password for the P2P network is randomly generated for the user by the device. It allows the peer-to-peer network setup to be initiated without the user entering the password manually. In one embodiment, the password comprises one or more characters which are not limited to characters that the user is able to enter. In one embodiment, the password is a share secret among three or more devices of a peer-to-peer network if the peer-to-peer network is fully connected rather than a star topology peer-to-peer network.

In one embodiment, setting up a peer-to-peer network is used in conjunction with other protocols, such as, for example, IEEE 802.16 and IEEE 802.21, IEEE 802.11, IEEE 802.15, and LTE/3G.

In one embodiment, controller 303 manages and coordinates operations of wireless processing unit 304, display unit 302, camera 306, and other components (not shown), such as, for example, a transceiver, an antenna, a power control unit, etc.

FIG. 4 is a flow diagram of one embodiment of a process to setup a peer-to-peer network. The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., network apparatus 301 with respect to FIG. 2). In one embodiment, the process is performed by a computer system with respect to FIG. 5.

Referring to FIG. 4, in one embodiment, processing logic begins by encoding data in a 2D barcode (process block 401). In one embodiment, processing logic in response to a user interaction (e.g., the user of network apparatus 330) encodes information which comprises user information, device information, network information, security information, or any combinations thereof into a QR code.

In one embodiment, processing logic receives a 2D barcode and an image associated with a master device (e.g., network apparatus 330) (process block 402). Processing logic decodes information from the QR code (process block 403). Processing logic displays the user information and network information together with the associated image to a user.

In one embodiment, processing logic receives a user's response (process block 404) and determines whether to initiate a peer-to-peer network setup with the master device. In one embodiment, processing logic initiates network setup based at least on the user response (process block 405).

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
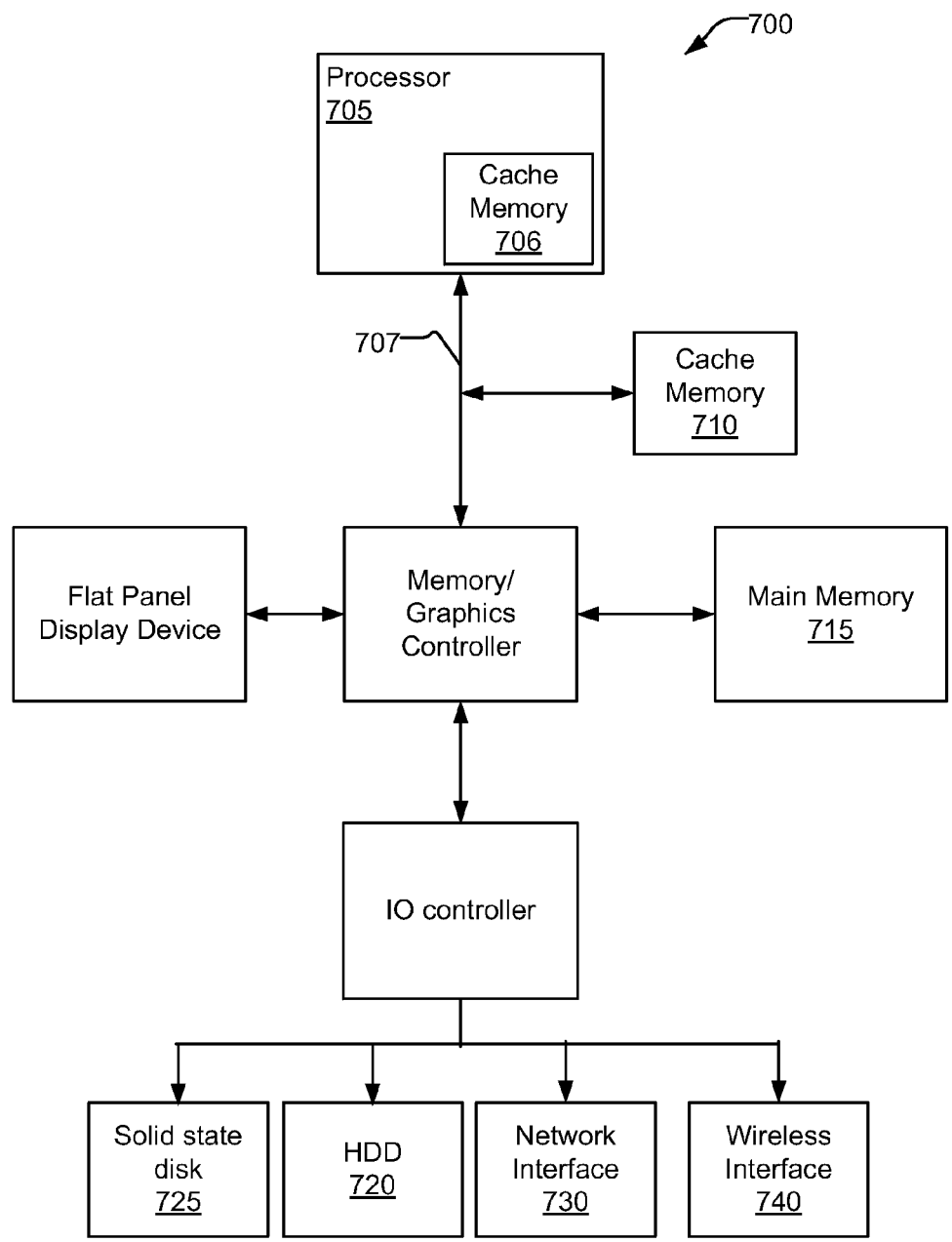
FIG. 5 illustrates a computer system for use with one embodiment of the present invention.

FIG. 5 illustrates an example of computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A network apparatus comprising:
a hardware processor to communicate with a first master device, receive an image associated with a user of the first master device and receive encoded data in a two-dimensional (2D) barcode, wherein the encoded data comprise at least user information associated with the first master device including a user identifier, a device identifier, or both; and
network information including a network identifier, a password, and a profile lifetime value, wherein the password is a share secret among three or more devices of a peer-to-peer network if the peer-to-peer network is fully connected rather than a star topology peer-to-peer network; and
a display unit operable to display at least part of the user information and the network information encoded in the 2D barcode to a first user and the image for the user to verify an identity of the first master device, wherein the processor is operable to initiate a peer-to-peer network setup with the first master device based at least on a response from the first user verifying the network information encoded in the 2D barcode.

2. The network apparatus of claim 1, wherein the processor is operable to receive an image associated with the first master device.

3. The network apparatus of claim 2, wherein the processor is capable of receiving the barcode from a camera image.

4. The network apparatus of claim 2, wherein the processor is capable to receive the user information via non-secured communication.

5. The network apparatus of claim 4, wherein the peer-to-peer network setup is initiated without the first user remembering the password.

6. The network apparatus of claim 4, wherein the peer-to-peer network setup is initiated without the first user entering the password manually, wherein the password comprises one or more characters that are not limited to characters which the first user is able to enter.

7. The network apparatus of claim 4, wherein the processor is operable to store the network information based at least on the first user's preference and the profile lifetime value.

8. The network apparatus of claim 4, wherein the user information associated with the first master device is used for an identification purpose instead of a physical IP address.

9. A computer implemented method comprising:
receiving encoded data in a two-dimensional (2D) barcode generated by a first master device, wherein the encoded data comprise at least user information associated with the first master device including a user identifier, a device identifier, or both, and network information including network identifier, a password, and a profile lifetime value, wherein the password is a share secret among three or more devices of a peer-to-peer network if the peer-to-peer network is fully connected rather than a star topology peer-to-peer network;
displaying at least part of the user information and network information encoded in the 2D barcode to a first user; and
initiating a peer-to-peer network setup with the first master device based at least on a response from the first user verifying the network information encoded in the 2D barcode.

10. The computer implemented method of claim 9, further comprising:
receiving an image associated with the first master device or a user of the first master device; and
displaying the image for the first user to verify an identity of the first master device.

11. The computer implemented method of claim 9, further comprising receiving the barcode from a camera image.

12. A non-transitory computer readable medium having a computer program which when executed causes a processor to:
receive encoded data in a two-dimensional (2D) barcode generated by a first master device, wherein the encoded data comprise at least user information associated with the first master device including a user identifier, a device identifier, or both; and network information including a network identifier, a password, and a profile lifetime value, wherein the password is a share secret among three or more devices of a peer-to-peer network if the peer-to-peer network is fully connected rather than a star topology peer-to-peer network;
receive an image associated with a user of the first master device;
display at least part of the user information and the network information encoded in the 2D barcode to a first user;
display the image for the user to verify an identity of the first master device; and initiate a peer-to-peer network setup with the first master device based at least on a response from the first user verifying the network information encoded in the 2D barcode.

13. The computer readable medium of claim 12 having a computer program which when executed further causes the processor to:
receive an image associated with the first master device or a user of the first master device; and
display the image for the first user to verify an identity of the first master device.

14. The computer readable medium of claim 12 having a computer program which when executed further causes the processor to receive the barcode from a camera image.

* * * * *